(12) United States Patent
Buzynski

(10) Patent No.: US 10,286,505 B2
(45) Date of Patent: May 14, 2019

(54) AUXILIARY TABLE FOR MILLING MACHINE AND METHOD OF RECONFIGURING A MILLING MACHINE

(71) Applicant: Donald J. Buzynski, Commerce Township, MI (US)

(72) Inventor: Donald J. Buzynski, Commerce Township, MI (US)

(*) Notice: Subject to any disclaimer, the term of this patent is extended or adjusted under 35 U.S.C. 154(b) by 105 days.

(21) Appl. No.: 15/075,330

(22) Filed: Mar. 21, 2016

(65) Prior Publication Data

US 2016/0311074 A1 Oct. 27, 2016

Related U.S. Application Data

(60) Provisional application No. 62/150,528, filed on Apr. 21, 2015.

(51) Int. Cl.
*B23Q 3/02* (2006.01)
*B23Q 1/74* (2006.01)

(52) U.S. Cl.
CPC ..................... *B23Q 1/74* (2013.01)

(58) Field of Classification Search
CPC ........... Y10T 408/567; Y10T 408/5612; Y10T 408/56245; Y10T 408/563; Y10T 29/5105; Y10T 29/5107; Y10T 29/4978; Y10T 408/561; Y10T 409/305544; Y10T 409/3056; Y10T 409/30868; Y10T 409/30616; Y10T 409/307; Y10T 409/309016; B23B 47/28; B23B 31/11; B23Q 16/001; B23Q 3/02; B23Q 3/062–3/065; B23Q 3/069; B23Q 1/28; B23C 2270/08; B23C 3/00; B23C 5/10; B23C 5/107
See application file for complete search history.

(56) References Cited

U.S. PATENT DOCUMENTS

| | | | |
|---|---|---|---|
| 2,533,753 A | 2/1947 | Armitage et al. | |
| 4,416,042 A * | 11/1983 | Hinson | B23C 1/20 29/239 |
| 6,230,070 B1 | 5/2001 | Yodoshi | |
| 7,753,350 B2 * | 7/2010 | Barziza | B23Q 3/103 269/100 |

* cited by examiner

*Primary Examiner* — Jun S Yoo
(74) *Attorney, Agent, or Firm* — John R. Benefiel

(57) ABSTRACT

A method and auxiliary work piece table for enhancing the utility of a milling machine or like machines. The auxiliary work table is installed onto an original work piece table and has mounting features as similar to the original work piece table after raising a tool holder by installing a spacer on a support column. This arrangement restores the original vertical workpiece clearance to allow normal use of the milling machine for said workpieces sizes machinable by said machine using the original worktable. The auxiliary work table is easily removable when additional vertical space is required as when very tall work pieces are to be machined, and is then able to be quickly reinstalled afterward to again enable machining of workpieces machinable using said original work table.

7 Claims, 3 Drawing Sheets

AUXILIARY TABLE FOR MILLING MACHINE AND METHOD OF RECONFIGURING A MILLING MACHINE

CROSS REFERENCE TO RELATED APPLICATION

This invention claims the benefit of U.S. provisional patent application Ser. No. 62/150,528 filed on Apr. 21, 2015.

FIELD OF THE INVENTION

The invention relates to machine tools and in particular to milling machines or similar machine tools, which are conventionally provided with a built in work table for securing a work piece to be machined with overhead tooling used to perform the machining as the work table is traversed past the tooling.

BACKGROUND OF THE INVENTION

Milling machines and similar surface cutting machine tools include a built in work table, that is, a planar surface on which work pieces are securely and accurately mounted, usually in various types of work holders. The work mounting surface of the work table includes anchoring and alignment structures for the secure and accurate mounting of work pieces to be ready for being machined. The work table of an exemplary milling machine, the Bridgeport® Mill, includes T-slots formed therein, i.e., channels that resemble inverted letters-T's, which run along the length of the work surface. The T-slots accept a variety of keys and bolts, for the precise alignment and fastening of work piece holders to the work surface. Similar work tables are also included in other similar machines such as CNC machining centers.

In a typical milling machine, a work piece is affixed to a built in work table and operated upon by a tool mounted in a motor driven quill, which extends downward from a head. The head is held over the work piece by an overarm, which extends from an upright column. The work table is mounted upon a knee, and can be moved vertically, toward or away from the head, by travel of the knee along a vertical track (not shown) and is traversed past the tooling during machining.

A problem inherent in such machines is the limited vertical travel of the work table. The work table often cannot be lowered sufficiently to accommodate very tall work pieces beneath the head, and cannot be raised sufficiently to bring very short work pieces into the range of an overhead mounted tool.

One way to solve the problem of insufficient work table travel is to alter the height of the column that supports the head. This requires disassembly and reassembly of structural elements of the milling machine. This solution is time consuming and requires much effort. In the case of Bridgeport® Mill, this is done by detaching the overarm and head from the column; mounting a donut shaped spacer (S in FIG. 1) atop the column; and mounting the overarm upon the spacer. Because the overarm supports a heavy motor drive and transmission, the addition or removal of a spacer is a task that requires a hoist and multiple operators, and can take several hours to complete. For this reason once a spacer has been installed and the job is completed, it is generally simply left in place awaiting the next too tall work piece.

This is because the adjusted height state of the machine necessitates the use of extended tooling to reach a short or normal sized work piece. Extended tools are less rigid and stable than corresponding tools of normal length and their use is usually avoided if possible. Another drawback is that, when the head is articulated to direct a tool toward an edge of the work table; even an extended tool may not reach the most peripheral areas of the work surface which allows the machine to be quickly and easily restored to its original capabilities. As a result, once a spacer has been installed, the machine in question is often only used for jobs involving very tall work pieces, and sits idle most of the time.

Work-holding accessories have been used that are attachable to the work table of a milling machine, and most them inherently provide some elevation to a work piece but do not restore a modified machine to its normal capabilities.

For example, several devices mountable upon the work table of a milling machine are disclosed in a web site posted by an author known as John 5293 (http://johnfsworkshop.org/home/links-to-other-pages/the-milling-machine/the-milling-machine-workholding/milling-machine-workholding-tilting-devices/). These devices provide angled surfaces for the attachment of work pieces, and they necessarily also elevate the work pieces above the work surface of the work table. One of the devices is a wedge, depicted in FIG. 427X of John 5293. Although it is simple in construction, and easily handled and mounted, its fixed, sloped upper surface tilts a work piece as well as elevates it. Alignment and anchoring structures, such as T-slots, are not present on the surface of the wedge. Furthermore, the wedge includes no means of stable attachment to a work table.

Other devices disclosed by John 5293 include a tilting table (FIGS. 40X and 551X), and a sine table (FIG. 38X), which designed to provide work surfaces set at precise angles relative to a work table. These devices do accommodate fastening hardware, and their upper surfaces do replicate the T-slots of the work table. The tilting table and sine table are, however, of heavy and complex construction. They do not mount quickly or simply, because their angling mechanisms must be laboriously adjusted to obtain a work surface parallel to the surface of the work table 28.

Another complex accessory that requires angular adjustment is disclosed in U.S. Pat. No. 6,230,070 to Yodoshi. Yodoshi discloses a positioning device including a rectangular base, which is affixable to the work table of a mill machine, and a rectangular mounting member rotatably mounted upon the base. The Yodoshi device does anchor firmly to a work table, but it blocks access to the anchoring and alignment structures of the worktable, and it provides no surface structures to replace them.

U.S. Pat. No. 2,533,753 to Armitage, et al., discloses work-holding fixtures that can be slid along the work table of a milling machine. These fixtures do elevate a work piece and require no angular adjustment prior to use. They do not however, replicate the surface features of the worktable. Instead, they include specialized holders for particular work pieces.

None of these prior art accessories allow quick restoration of the original capabilities to elevate a work piece above the work table of a milling machine.

It is an object of the present invention to provide an arrangement and method enabling a height modified milling machine or the like which enables a quick change to and from a normal machine to a height increased modified machine conveniently to quickly accommodate very high work pieces while being able to be quickly and easily restored to enable normal operation.

SUMMARY OF THE INVENTION

The present invention a solution to the problem of insufficient vertical travel of the work table of conventional milling machines by first adjusting the height of the overhead arm by installing a column spacer. An auxiliary work table is then installed onto the existing work table using the mounting fasteners of the original table. The height of the auxiliary table is of a height about the same as the column spacer.

Thus, the auxiliary work table is configured so that the auxiliary table upper surface is at the same height relative the overhead arm height as in the unadjusted original machine. The upper side of the auxiliary table accepts the same fastening hardware as the original table for stable anchorage of workpieces on a work table. The upper surface of the auxiliary work table is parallel to the original work surface of a work table and replicates the anchoring and alignment structures of the original work table, such as the T-slots typical of a Bridgeport® Mill work table.

In the preferred embodiment, the auxiliary table is of unitary construction, and includes hollow bays and integral handles, to reduce weight and facilitate rapid manual mounting and dismounting.

The present invention also contemplates a kit including at least two auxiliary work tables of different heights to readily enable machining of very short work pieces.

The present invention further includes a method of restoring the standard work table to enable a quick modification of the machine to enable machining of a very tall work piece on short notice by simply removing the auxiliary work table.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
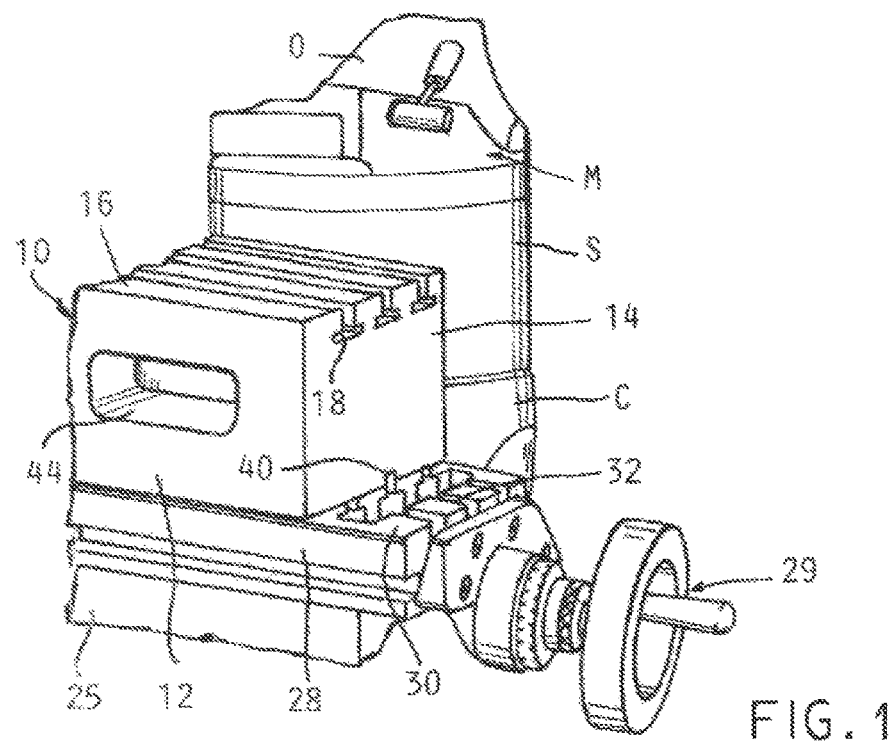
FIG. 1 is a fragmentary view from one side of a milling machine according to the present invention having an auxiliary work table mounted on the original work table of the milling machine shown.
Figure 2:
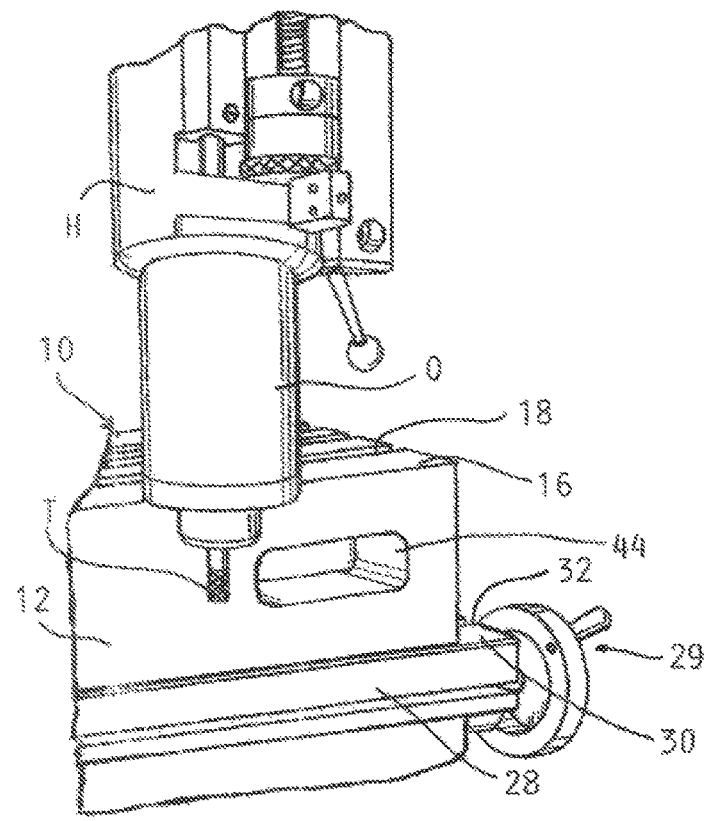
FIG. 2 is a fragmentary view from the front of the modified milling machine of the milling machine shown in FIG. 1.

Referring to FIGS. 1 and 2, a portion of a milling machine M is shown which has an original built in work table 28 mounted to a support 25 which can be moved vertically by operation of a dial 29 in the conventional fashion.

The upright column C supporting the head 14 has been made higher by the installation of a commercially available donut shaped spacer S (FIG. 1) which raises a tool supporting overhead arm O in turn elevating the tool holding quill Q (FIG. 2) in the manner known in the art.

According to the method of the present invention, the spacer S is normally left in place.

To restore the original spatial relationship between a work table upper surface and the overhead arm O and quill Q, an auxiliary work table 10 is assembled onto the top of the original work table 28.

The auxiliary work table 10 according to the present invention, generally shown as 10 in FIGS. 1 and 2, is of one piece to be quickly removed and replaced and of a preferably rectangular in shape but can be of any desired shape, provided that its upper surface 30 and lower surface 24 are both precisely parallel with the work surface 30 of the original work table 28. The lateral sides 12 and the ends 14 of the auxiliary work table 10 are of a height sufficient to compensate for the gap between the maximum achievable height of the work surface 30 of the original work table 28, and the appropriate height at which a work piece is to be supported. An exemplary auxiliary work table 10 is 6.0 inches in height 35¾ inches in length, and 9.0 inches in width.

The upper surface 16 of the auxiliary work table 10 replicates at least a subset of the structural elements of the work surface 30 of the original work table 28 and is large enough to machine a range of sizes of work pieces mounted thereto for machining comparable to that of the original work table. In the case of the exemplary Bridgeport® Mill, the upper surface 16 of the auxiliary work table 10 includes three parallel T slots 18 that exactly replicate the longitudinal T-slots 32 of the specific Bridgeport® Mill work table 28.

The auxiliary work table 10 of the present invention when securely mounted also provides stability of the work piece that is comparable to the stability of the original work table 28. In the illustrative example, the auxiliary work table 10 includes bolt holes 36 within the auxiliary work table T-slots 18, to accept locking bolts 38, such as T-bolts (not shown) that extend downward through the auxiliary work table 10 to engage the T-slots 32 of the original work table 28. Alternatively, any suitable engagement hardware can be used to anchor the auxiliary work table 10 atop the original work table 28.

The auxiliary work table 10 preferably also includes key locators 40 extending through both ends 14 of the auxiliary work table 10. The key locator 40 accommodates a removable key (not shown) that protrudes downward below the lower surface 34 of the auxiliary work piece 10, into a T-slot 32 or other keyway (not shown) of the original work table 28. The key (not shown) facilitates the rapid and precise alignment of the auxiliary work table 10 with the T-slots 32 of the original work table 28, before the auxiliary work table 10 is fastened into place.

Figure 3A:
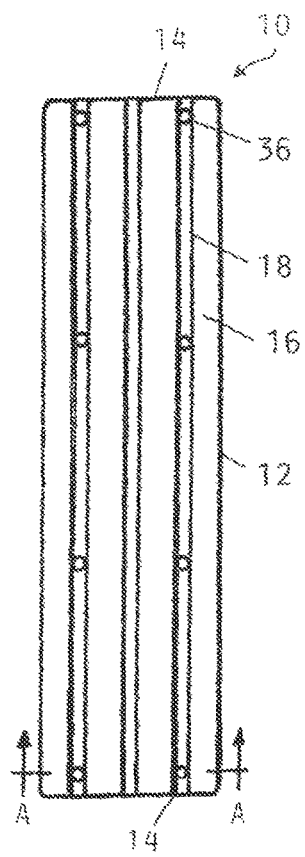
FIG. 3A is a top view of an auxiliary work table according to the invention.
Figure 3B:
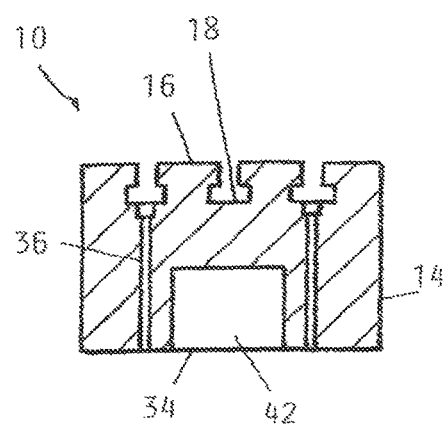
FIG. 3B is a view of a cross section taken through the auxiliary work table taken along the line A-A of FIG. 3A.
Figure 3C:
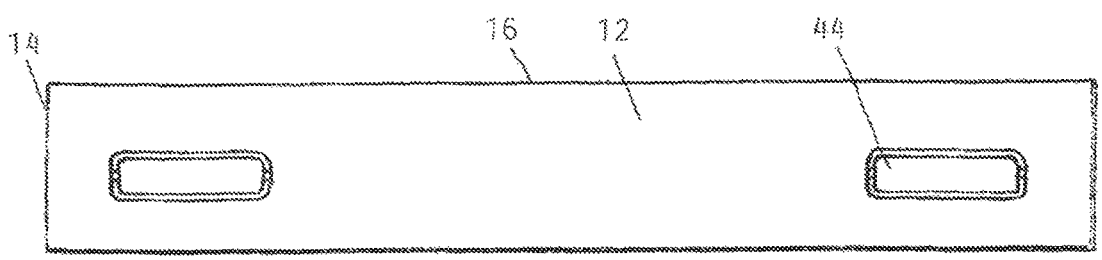
FIG. 3C is a front view of the auxiliary work table shown in FIG. 3A.
Figure 4A:
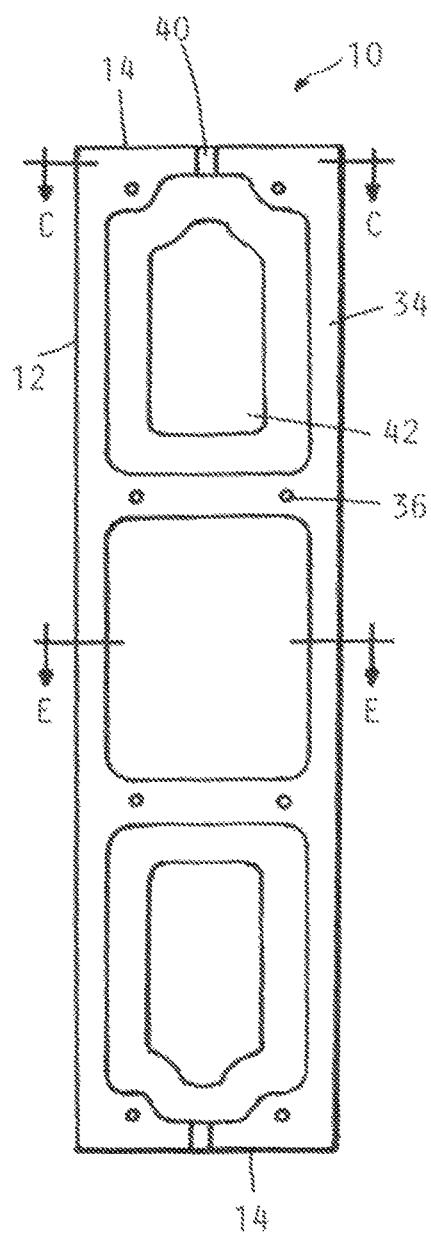
FIG. 4A is a bottom view of the auxiliary work table shown in FIG. 3A.
Figure 4B:
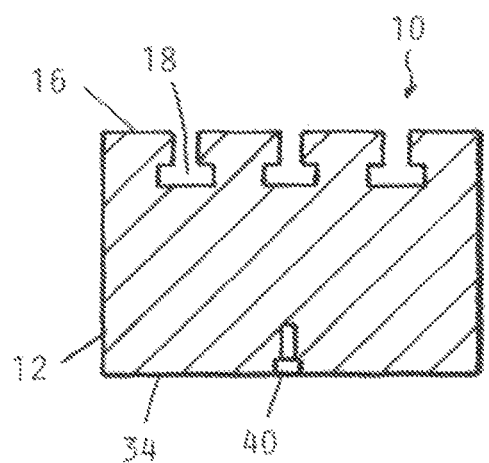
FIG. 4B is a cross sectional view of the auxiliary work table taken along lines C-C in FIG. 4A.
Figure 4C:
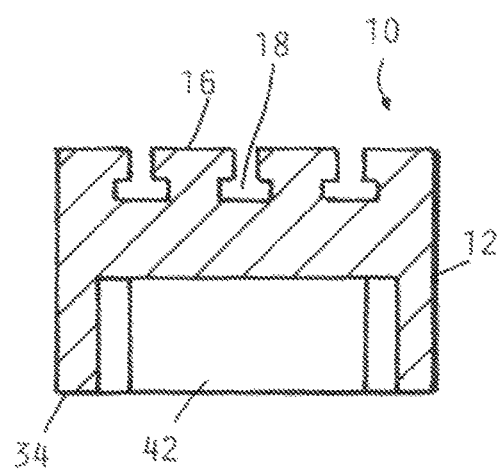
FIG. 4C is a cross sectional view taken through the auxiliary work table taken along lines E-E of FIG. 4A.

The auxiliary work table 10 also includes features that facilitate the tasks of lifting the auxiliary work table 10, in mounting it to the original work table 28, and unmounting it. Lightweight unitary construction is produced by machining the hole 10 from an auxiliary work block of aluminum or another suitable lightweight metal or alloy or molded from such a metal. Hollow interior bays 42 (FIGS. 3B and 4C) are preferably included. The bays 42 can be sealed, partially open to the lower surface 34 of the auxiliary work table 10, or completely open to the lower surface 34 (FIG. 4B). Recesses 44 molded into the sides of the auxiliary work table (FIGS. 1, 2, 3C) also facilitate the manipulation of the auxiliary work table 10. These are preferably integral, to further reduce weight and to optimize the simplicity of construction of the auxiliary work table 10.

The auxiliary work table 10 allows a novel method for dealing with the problem of insufficient vertical travel of the original work table 28 of the milling machine M.

Firstly, the spacer S is installed to the column C and is permanently left in place during use of the machine M.

The auxiliary work table 10 is then installed atop the original work table 28 and left in place during normal use of the machine M as the original travel and space is thereby restored.

Only on the infrequent occasions when very tall work pieces are to be machined, will the auxiliary work table need to be removed. Again, this is a quick and easy process to be convenient to carry out.

In effect, the milling machine M is permanently reconfigured so as to normally be ready for normal use, but is easily modified for the infrequent use with very tall work pieces.

The auxiliary work table 10 can be deployed without detaching a work piece from a vise or other work holder, because the same T-slots 32 or other surface structures that accept the work holder on the work table 28 are also present on the upper surface 16 extending in the same direction as that of the auxiliary work table 10. The work holder can simply be removed from the original work table 28 and transferred to the auxiliary work table 10.

The auxiliary work table 10 is especially useful when provided as a component of a kit, which includes at least two auxiliary work tables 10 of different heights. A kit of auxiliary work tables 10 for a Bridgeport® Mill, for example, can provide a plurality of auxiliary work tables 10 varying at 2.0 inch increments in height, up to a maximum height of 10.0 inches. The auxiliary work table 10 can also vary in length, from a minimum length of 12.0 inches. The kit (not shown) increases the precision and flexibility with which a work piece can be elevated toward a tool that is beyond an elevation attainable by vertical work table travel alone.

The present invention provides a method for elevating a work piece above the work table 28 of a milling machine (M), including the steps of placing a auxiliary work table 10 on the work surface 30 of the work table 28 of a milling machine (M), orienting the auxiliary work table 10 to a desired point on the work surface 30, placing a work piece on the upper surface 16 of the auxiliary work table 10, and elevating the work piece.

The step of orienting the auxiliary work table 10 at a desired point on the work surface 30 can additionally include the steps of inserting a key (not shown) through a key locator 40 of the auxiliary work table 10, inserting the key (not shown) into a T-slot 32 of the work table 28, aligning the auxiliary work table 10 with the T-slot 32 of the work table 28, and moving the auxiliary work table 10 to a desired point on the work surface 28. The steps of fastening the auxiliary work table 10 to the work surface 28 can additionally include the steps of inserting a locking bolt 38 through a bolt hole 36 traversing the auxiliary work table 10, and engaging the locking bolt 38 with a T-slot 32 of the work table 28.

The step of placing a work piece on the upper surface 16 of the auxiliary work table 10 can additionally include the steps of placing the work piece in a work holder (not shown), and engaging the alignment structures on a lower surface (not shown) of the work holder (not shown) with the corresponding T-slots 18 or other alignment structures (not shown) on the upper surface 16 of the auxiliary work table 10.

Although the auxiliary work table 10 shown is adapted specifically for use on the work table 28 of a Bridgeport® Mill, it is readily adapted for use with any type of work table that is used in conjunction with any sort of machine tool. Modifications in the dimensions of the auxiliary work table 10, and the substitution of alternative alignment structures for the auxiliary work table T-slots 18, will produce an auxiliary work table 10 that is enabled for use with any machine tool known in the art which has this problem in use.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

The invention claimed is:

1. A method of reconfiguring a milling machine or similar machine of a type including an original work table for mounting a workpiece to be machined, said work table having an array of work piece mounting features on an upper surface thereof with a cutting tool holder supported by an upright machine column projecting above the said work table, comprising:
    installing a column spacer onto said column to raise the height of said tool holder above a top surface of said original work table;
    installing a one piece auxiliary work table of a height on the order of the height of said column spacer to thereby provide a clearance space above said auxiliary work table surface for mounting workpieces on said auxiliary work table, said clearance space on the order of said clearance space existing without the presence of neither said column spacer nor said auxiliary work table installed thereon, said auxiliary work table large enough to have an array of workpiece mounting features thereon so as to allow a range of sizes of workpieces to be mounted thereto comparable with the normal capability of the machine with the original work table alone without the auxiliary work table and the column spacer; and
    thereafter leaving said column spacer and said auxiliary work table installed on said machine for carrying out subsequent typical machining jobs on said range of sizes on workpieces by mounting said workpieces on said auxiliary work table, and removing said auxiliary work table as necessary to allow machining of a very tall workpiece requiring additional vertical clearance, and mounting said very tall workpiece on said original work table while leaving said column spacer in place so as to enable machining of said very tall workpiece mounted on said original work table by the additional overhead space created by said column spacer.

2. The method according to claim 1 wherein said auxiliary work table is attached to said top surface of said original work piece table utilizing said work piece holding features used to mount workpieces to said original work table.

3. The method according to claim 1 further including inserting key locator elements through openings in said auxiliary work table to engage a T-slot in said original work table.

4. The method according to claim 1 wherein said auxiliary work table comprises a unitary oblong block installed on said original work table so as to be substantially covering said original work table top surface.

5. The method according to claim 1 wherein said original work table is formed with a set of three parallel T slots and said auxiliary work table is also formed with a set of three parallel T slots on the top surface thereof and orienting said auxiliary work table on said original work table so that both sets of T slots are parallel to each other so as to enable mounting workpieces thereon by similar attachments as when mounting said workpieces on said original work table.

6. The method according to claim 1 wherein said auxiliary work table is six inches high and is substantially matched to the height of said spacer.

7. The method according to claim 5 wherein said auxiliary work table is attached to said original work table by locking fasteners received in through holes at the bottom of said T slots of said auxiliary work table and received in holes at the bottom of said aligned T slots in said original work table.

\* \* \* \* \*